(12) United States Patent
Marushima et al.

(10) Patent No.: US 8,701,634 B2
(45) Date of Patent: Apr. 22, 2014

(54) ZERO-GOVERNOR FITTING CONFIGURATION IN GAS ENGINE

(75) Inventors: Hiroyoshi Marushima, Kanagawa (JP); Hiroyoshi Kochi, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 457 days.

(21) Appl. No.: 13/139,556

(22) PCT Filed: Oct. 19, 2009

(86) PCT No.: PCT/JP2009/068011
§ 371 (c)(1),
(2), (4) Date: Jun. 23, 2011

(87) PCT Pub. No.: WO2010/082387
PCT Pub. Date: Jul. 22, 2010

(65) Prior Publication Data
US 2011/0259303 A1    Oct. 27, 2011

(30) Foreign Application Priority Data
Jan. 16, 2009 (JP) .................. 2009-007567

(51) Int. Cl.
*F02M 37/00* (2006.01)

(52) U.S. Cl.
USPC .......................................... 123/511; 123/510

(58) Field of Classification Search
CPC .......... F02M 37/0029; F02M 37/0052; F02M 37/0076; F02M 37/0082; F02M 69/16
USPC ........................... 123/506, 510, 511, 527, 575
See application file for complete search history.

(56) References Cited

U.S. PATENT DOCUMENTS

| 3,396,748 A | * | 8/1968 | Hatakeyama et al. | ........ 137/587 |
| 4,653,528 A | * | 3/1987 | Field et al. | .................... 137/269 |

(Continued)

FOREIGN PATENT DOCUMENTS

| CN | 1287221 | 3/2001 |
| JP | 63-170562 | 11/1988 |

(Continued)

OTHER PUBLICATIONS

Chinese Notification of Completion of Formalities for Registration issued Apr. 28, 2013 in corresponding Chinese Patent Application No. 200980152762.0 with English translation.

(Continued)

*Primary Examiner* — Willis R. Wolfe, Jr.
*Assistant Examiner* — Anthony L Bacon
(74) *Attorney, Agent, or Firm* — Wenderoth, Lind & Ponack, L.L.P.

(57) ABSTRACT

A zero-governor fitting structure for a gas engine, configured in such a manner that the lower half of a fuel tank for a gasoline engine is utilized as a support box for supporting the zero-governor in which a gas supply inlet pipe and a zero governor can be reliably mounted with vibration and heating of the zero-governor avoided. A zero-governor mounting structure for a gas engine equipped with a zero-governor is provided with a support box fixed to the upper part of the gas engine. The support box is formed as a box having two depths. The zero-governor is supported, through a vibration insulation gasket, on the bottom plate of the shallower depth space of the support box. A gas supply inlet pipe and an elbow joint which is connected to the gas supply inlet pipe and can be bent the direction of the gas flow at a right angle toward the zero-governor are received in the deeper depth space, and the elbow joint is connected to the bottom inlet of the zero-governor.

3 Claims, 4 Drawing Sheets

(56) References Cited

U.S. PATENT DOCUMENTS

| | | | |
|---|---|---|---|
| 6,332,433 B1* | 12/2001 | Kobayashi et al. | 123/2 |
| 8,047,187 B2* | 11/2011 | Ono et al. | 123/573 |
| 2005/0173918 A1* | 8/2005 | Eguchi et al. | 280/834 |

FOREIGN PATENT DOCUMENTS

| | | |
|---|---|---|
| JP | 3-111658 | 5/1991 |
| JP | 2001-73794 | 3/2001 |
| JP | 2001-343100 | 12/2001 |
| JP | 2010-25023 | 2/2010 |

OTHER PUBLICATIONS

International Preliminary Report on Patentability and Written Opinion of the International Searching Authority issued Jul. 19, 2011 in International (PCT) Application No. PCT/JP2009/068011 with English translation.

International Search Report issued Dec. 8, 2009 in International (PCT) Application No. PCT/JP2009/068011.

Japanese Office Action issued Jul. 12, 2012 in corresponding Japanese Patent Application No. 2009-007567 with English translation.

* cited by examiner

ZERO-GOVERNOR FITTING CONFIGURATION IN GAS ENGINE

BACKGROUND OF THE INVENTION

1. Field of the Invention

The present invention is applied to small gas engines for general-purpose use; in the main chamber that is demarcated by the engine main components such as the cylinder head, lean-burn combustion is performed; namely, the lean air-fuel mixture that is pre-mixed in an air-fuel (main fuel gas) mixer is burnt; the present invention relates to a fitting arrangement regarding a zero-governor that can suitably establish or regulate the pressure of the fuel gas supplied to the air-fuel mixer.

2. Background of the Invention

The patent reference (JP2001-73794) discloses a gas engine generator unit that is accommodated in a housing, as an example of farm working machinery; as shown in FIGS. 3 and 4 of this application in response to FIGS. 3 and 8 of the patent reference, the many components of a gasoline engine generator are used for the gas engine generator A; namely, the gas engine generator unit makes use of the components such as an engine unit U, a rigid frame F, an exhaust muffler 05 and an air cleaner Ac (not shown), as far as possible.

In the gas engine generator of the patent reference, the very upper half of a fuel tank provided in the gasoline engine generator is diverted to an upper cover Ca as a roof body of the gas engine; in the upper half space of the fuel tank, some components such as a zero-governor (a fuel gas pressure regulator) Z are provided; in addition, on the filler opening (the gasoline supply opening) of the fuel tank, an appropriate cap 020 instead of the filler cap is fitted.

In other words, in the gas engine disclosed by the patent reference, the upper half part of the fuel tank that is used in the gasoline engine generator is converted into a cover of the gas engine; and, the cap 020 is fitted on the cover.

In the patent reference (JP2001-73794) as described above, the upper half of a fuel tank provided in the gasoline engine generator is diverted to the upper cover Ca as a roof body of the gas engine; the zero-governor Z is arranged in the upper half of the fuel tank; in addition, on the filler opening of the fuel tank, the appropriate cap 020 instead of the filler cap is fitted.

However, the patent reference does not disclose effective utilization of the lower half of the fuel tank; namely, the lower half, just as it is, is not used in the gas engine generator, although the upper half is effectively utilized.

To be more specific, according to the patent reference, the upper half of the fuel tank for the gasoline engine is used as a cover provided with a capping function; the gas engine components such as the zero-governor Z is skillfully covered with the upper half of the fuel tank. According to the approach of the patent reference, however, the lower half part of the fuel tank for the gasoline engine is not directly ("directly" hereby means "just as it is") utilized for the arrangements of the zero-governor and the fuel gas supply inlet-pipe; only the upper half of the fuel tank is utilized for such arrangements; thus, a lower cover Cb and a stay S are provided in the configuration (structure) according to the patent reference, so as to fit the zero-governor and the fuel gas supply inlet-pipe.

REFERENCES

Patent References

Patent Reference 1: JP2001-73794

SUMMARY OF THE INVENTION

Subjects to be Solved

In view of the background (or the subjects) of the conventional technology, the present invention aims at providing a zero-governor fitting configuration; thereby, not only of the upper half but also the lower half of the fuel tank for a gasoline engine can be used, and the zero-governor and the fuel gas supply inlet-pipe can be surely arranged so that the engine vibrations and the heat radiation can be prevented from transmitting to the zero-governor.

Means to solve the Subjects

In order to solve the subjects, the present invention discloses a zero-governor fitting structure for fitting the zero-governor to a gas engine, comprising at least one main chamber formed in a cylinder head so that air-fuel mixture of main fuel gas and air that are pre-mixed in an air-fuel mixer is burnt in the main chamber, and a zero-governor which establishes or regulates suitably a pressure of a fuel gas supplied to the air-fuel mixer, wherein a fuel tank which serves as a support box for supporting the zero-governor is provided to be fastened to an upper part of the gas engine, the support box being formed into a box body having two spaces of different depths, so that the zero-governor is fitted to a bottom plate of the shallower depth space of the support box via a vibration insulation gasket, and a gas supply inlet pipe and an elbow joint connected to the gas supply inlet pipe are housed in the deeper depth space of the support box, the direction of the gas flow from the gas supply inlet pipe is bent orthogonally toward the zero-governor at the elbow joint which is connected to a fuel gas inlet at the bottom of the zero-governor.

A preferable embodiment of the present invention is the zero-governor is tightened and fastened to an upper surface of the bottom plate of the shallower depth space of the support box via the vibration insulation gasket by a plurality of bolts that are inserted into the shallower depth space from below of the bottom plate, and the zero-governor is also supported from the bottom side by the gas supply inlet pipe and the elbow joint that are housed in the deeper depth space of the support box.

Another preferable embodiment of the present invention is the zero-governor fitting structure, wherein the box body for housing and supporting the zero-governor is formed by remodeling the base structure of a fuel tank of a gasoline engine.

Effects of the Invention

According to the present invention, the gas engine is provided with the fuel tank (a box body for housing and supporting the zero-governor) so that the tank is fixed above the gas engine; the fuel tank comprises a space of a shallower depth and a space of deeper depth, namely, the box body having two bottom-surfaces of different depths forms the fuel tank; the zero-governor is fitted to the bottom plate of the shallower depth via the vibration insulation gasket; the zero-governor is supported by a gas supply inlet pipe and an elbow joint that are housed in the space of the deeper depth space of the fuel tank, the elbow joint being connected to the gas supply inlet pipe, the direction of the gas flow from the gas supply inlet pipe being bent at right angles at the elbow joint toward the zero-governor; the elbow joint is connected to the fuel gas inlet of the zero-governor at the bottom gas inlet of the zero-governor.

Thus, the fuel tank (a box body for housing and supporting the zero-governor) is provided so that the tank is fixed above the gas engine; the box body (the fuel tank) comprises a space of a shallower depth and a space of deeper depth; the zero-governor is fitted to the bottom plate of the space of the shallower depth space via the vibration insulation gasket; further, the zero-governor is supported by the gas supply inlet pipe and the elbow joint that are housed in the space of the deeper depth space of the box body (the fuel tank), the elbow joint being connected to the gas supply inlet pipe, the direction of the gas flow from the gas supply inlet pipe being bent at right angles at the elbow joint toward the zero-governor; the elbow joint is connected to the fuel gas inlet of the zero-governor, at the bottom gas inlet of the zero-governor.

Therefore, by using the box body that comprises a space of a shallower depth and a space of deeper depth, namely, by using the box body having two spaces of different depths forms the fuel tank, the gas supply inlet pipe and the elbow joint can be compactly housed in the box body; thereby, the elbow joint is connected to the gas supply inlet pipe; and, the direction of the gas flow from the gas supply inlet pipe being bent at right angles at the elbow joint toward the zero-governor.

Further, by supporting the zero-governor on the bottom plate via the vibration insulation gasket, the engine vibrations can be prevented from transmitting to the zero-governor; in addition, since the zero-governor is housed in the box body for supporting the zero-governor, the heat radiation from the cylinder or the muffler toward the zero-governor can be shut-off by the box body.

Moreover, by opening the lid of the fuel tank, the zero-governor can be easily checked and repaired.

According to a preferable embodiment of the present invention, the zero-governor is tightened and fastened to an upper surface of the bottom plate of the shallower depth space of the support box via the vibration insulation gasket by a plurality of bolts that are inserted into the shallower depth space from below of the bottom plate, and the zero-governor is also supported from the bottom side by the gas supply inlet pipe and the elbow joint that are housed in the deeper depth space of the support box.

In other words, the support base for supporting the zero-governor is fastened to the bottom plate, via the vibration insulation gasket, by means of the tightening bolts; further, in an auxiliary manner, the zero-governor is supported, from the bottom side, by the gas supply inlet pipe and the elbow joint that are housed in the space of the deep depth. Thus, the zero-governor is surely resiliently supported.

According to another preferable embodiment of the present invention, the box body for housing and supporting the zero governor is formed by remodeling the base structure of the gasoline engine fuel tank of a box shape, the box having two spaces of different depths T1 and T2 (T2>T1); the zero governor is supported by the gas supply inlet pipe and the elbow joint that are housed in the space of the deep depth; the zero-governor is supported by a gas supply inlet pipe and an elbow joint that are housed in the space of the deep depth of the fuel tank, the elbow joint being connected to the gas supply inlet pipe, the direction of the gas flow from the gas supply inlet pipe is bent orthogonally toward the zero-governor at the elbow joint; the elbow joint is connected to the fuel gas inlet of the zero-governor, at the bottom gas inlet of the zero-governor. In this way, by remodeling a portion of the base structure of a fuel tank, the zero-governor can be easily installed on the base of the zero-governor; and, the gas supply inlet pipe can be easily fitted to the zero-governor.

DETAILED DESCRIPTION OF THE PREFERRED EMBODIMENTS

Figure 1:
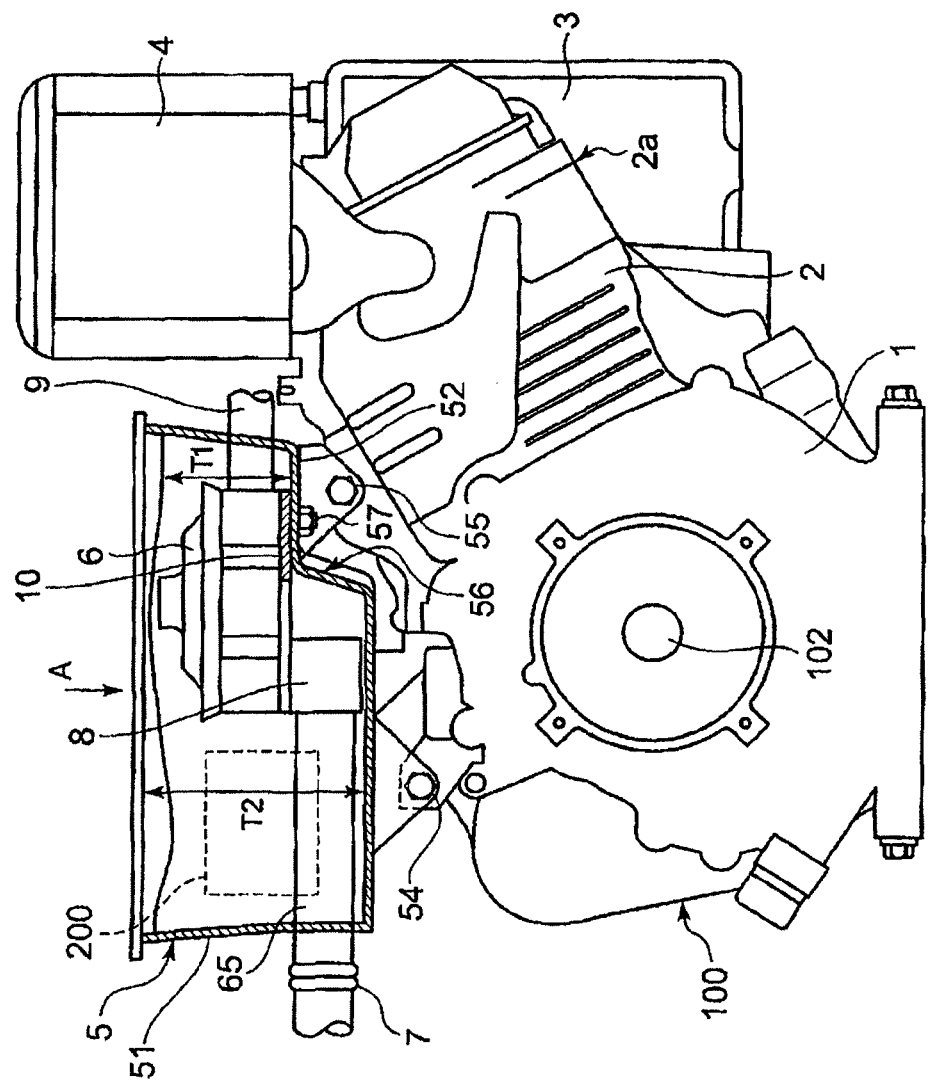
FIG. 1 shows a view of the gas engine along the direction of the longitudinal center axis of the crankshaft, according to a first embodiment of the present invention.
Figure 2:
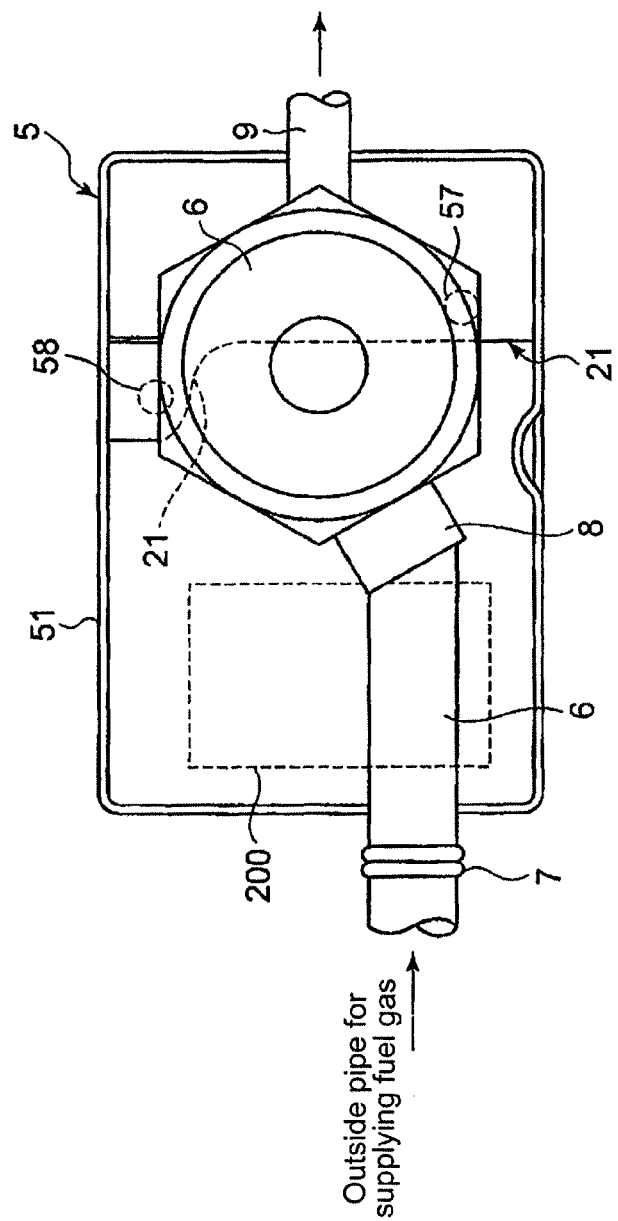
FIG. 2 shows A-arrow view regarding the A-arrow head in FIG. 1.
Figure 3:
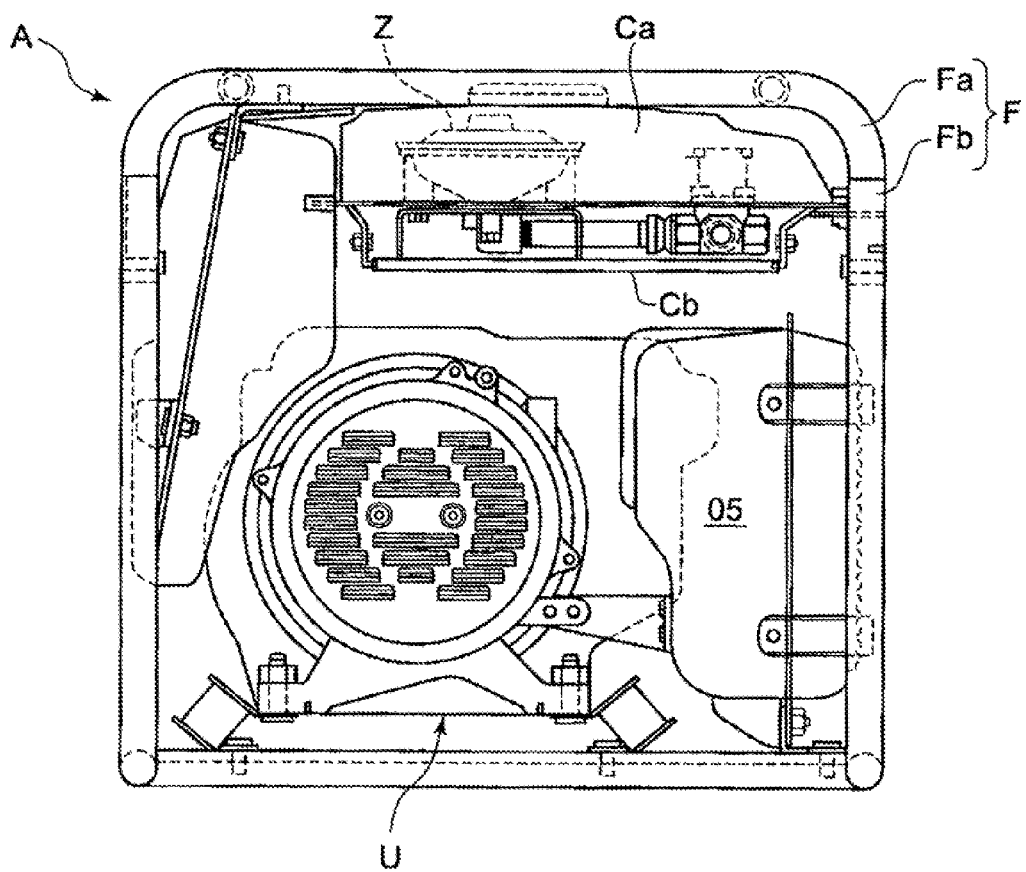
FIG. 3 explains the conventional technology.
Figure 4:
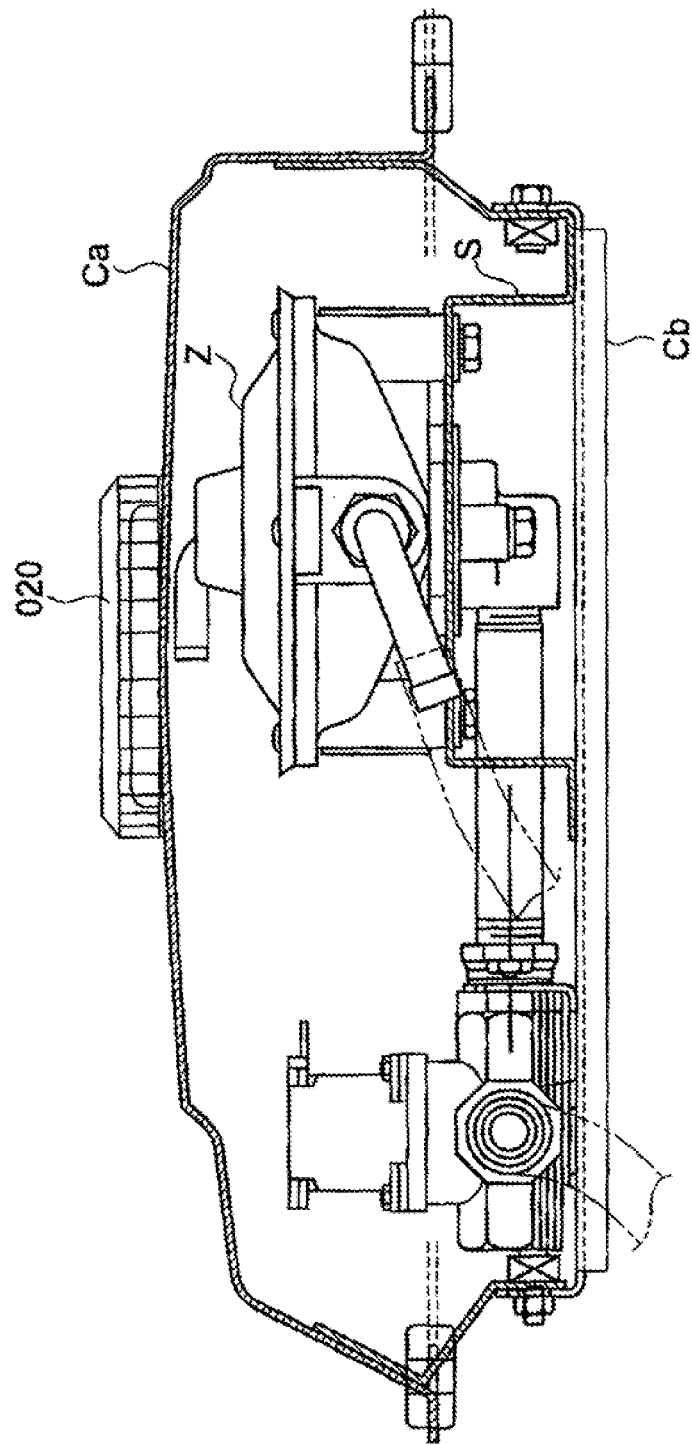
FIG. 4 explains the conventional technology.

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.
Embodiments FIG. 1 shows a view of the gas engine along the direction of the longitudinal center axis of the crankshaft, according to a first embodiment of the present invention; FIG. 2 shows A-arrow view regarding the A-arrow head in FIG. 1.

The gas engine in relation to the present invention is a four-stroke cycle gas engine provided with an auxiliary chamber in which air-fuel (gas) mixture is ignited by a spark plug; as shown in FIG. 1, the gas engine 100 is provided with a crankshaft 102, a crankcase 1, a cylinder 2, a cylinder head 2a, an air cleaner 3 for engine intake air, a muffler 4 for exhaust gas and so on. Since the internal configuration regarding the gas engine is a public knowledge item, the detail explanation is hereby omitted.

A fuel tank 5 is arranged above the gas engine, the fuel tank 5 being served as a support box for supporting the zero-governor; the fuel tank 5 is fastened to the upper part of the gas engine 100 at a plurality of locations (e.g. 2 to 4 locations), by use of bolts 54 and 55.

In this embodiment, the support box for supporting the zero-governor is manufactured by remodeling the base structure of the fuel tank 5 in the following manners, the fuel tank 5 being used for a gasoline engine.

The fuel tank 5 for the gasoline engine comprises a space of a relatively shallow depth T1 and a space of relatively deep depth T2; namely, a box body having two bottom-surfaces of different depths forms the fuel tank 5; further, as described above, the fuel tank 5 is fastened to the upper part of the gas engine 100 at multiple locations (e.g. 2 to 4 locations), by use of bolts 54 and 55.

A zero-governor 6 that can suitably regulate the pressure of the fuel gas supplied to the air-fuel (main fuel gas) mixer is fitted to a bottom plate 52 of the space of the shallow depth T1 via a vibration insulation gasket 10; namely, as shown in FIG. 2, the bolts 57 and 58 fasten the zero-governor 6 to the bottom plate 52, from the bottom. Further, as shown in FIG. 2, the bottom plate 52 and the vibration insulation gasket 10 are cut out so that the bolts 57 and 58 are easily tightened; the numeral 21 shows a cutout line.

The space of deep depth T2 houses a gas supply inlet pipe 6s and an elbow joint 8 that is connected to the gas supply inlet pipe 6s; the direction of the gas flow in the gas supply inlet pipe 6s is bent into a direction lying at right angles to the direction of the gas flow in the gas supply inlet pipe 6s, at the elbow joint 8; and, the elbow joint 8 is connected to the fuel gas inlet of the zero-governor 6, at the bottom gas inlet of the zero-governor.

An expansion joint 7 is set between the gas supply inlet pipe 6s and an outside pipe supplying the fuel gas to the inlet pipe 6s, so as to absorb the deformation of the gas supply inlet pipe 6s. Further, the fuel gas passing through the zero-governor 6 is sent into the air-fuel mixer, through a gas outlet pipe 9 of the zero-governor 6.

As described above, the zero-governor 6 is fitted to the bottom plate 52 of the space of the shallow depth T1 via the vibration insulation gasket 10; namely, the bolts 57 and 58 fasten the zero-governor 6 to the bottom plate 52, from the bottom; further, the zero-governor 6 is supported by the gas supply inlet pipe 6s and the elbow joint 8 that are housed in the space of the deep depth T2 of the fuel tank 5.

In this way, the zero-governor 6 is fastened to the bottom plate 52 of the space of the shallow depth T1 via the vibration insulation gasket 10; further, in an auxiliary manner, the zero-governor 6 is supported, from the bottom, by gas supply inlet pipe 6s and the elbow joint 8 that are housed in the space of the deep depth T2 of the fuel tank 5; thus, the zero-governor 6 can be surely resiliently-supported.

The bottom plate corresponding to the space of the shallow depth T1 of the fuel tank 5 is smoothly shifted to the bottom plate corresponding to the space of the deep depth T2 of the fuel tank 5, through a transition part 56; in addition, a side plate 51 surrounds the circumference of the space inside the fuel tank 5, and a lid 5a is provide on the upper ridge line of the side plate 51 so that the lid is detachably fitted to the fuel tank.

Thus, by remodeling a portion of the base structure of the fuel tank 5, the zero-governor 6 can be easily installed on the base of the zero-governor 6; and, the gas supply inlet pipe 6s can be easily fitted to the zero-governor 6.

According to the embodiment described thus far, the fuel tank 5 as the box body having two bottom-surfaces of different depths (e.g. T1 and T2) is formed, the box body being fastened to the upper part of the gas engine 100; the zero-governor 6 is fitted to the bottom plate 52 of the space of the shallow depth T1 via the vibration insulation gasket 10; further, the zero-governor 6 is supported by the gas supply inlet pipe 6s and the elbow joint 8 that are housed by the space of deep depth T2 of the fuel tank 5; the direction of the gas flow in the gas supply inlet pipe 6s is bent into a direction lying at right angles to the direction of the gas flow in the gas supply inlet pipe 6s, at (the location of) the elbow joint 8; and, the elbow joint 8 is connected to the fuel gas inlet of the zero-governor 6, at the bottom gas inlet of the zero-governor.

Thus, by use of the box body having two bottom-surfaces of different depths (e.g. T1 and T2), the zero-governor housing box 5 (the fuel tank 5) can compactly house the zero-governor 6, the gas supply inlet pipe 6s and the elbow joint 8; thereby, the direction of the gas flow in the gas supply inlet pipe 6s can be bent into a direction lying at right angles to the direction of the gas flow in the gas supply inlet pipe 6s, at the elbow joint 8.

Further, since the zero-governor 6 is supported via the vibration insulation gasket 10, the engine vibration can be prevented from transmitting to the zero-governor 6; further, since the zero-governor 6 is supported in the box body (i.e. the fuel tank 5 for housing the zero-governor), the heat radiation from the cylinder 2 and the muffler 4 of the engine 100 toward the zero-governor 6 can be cut-off.

In addition, by opening the lid 5a of the fuel tank 5, the zero-governor 6 can be easily checked and repaired.

Moreover, a fuel gas shut-off valve 200 can be arranged in the space of deep depth T2 regarding the fuel tank 5, thereby the fuel gas shut-off valve 200 may be used as a shut-off valve for shutting-off the fuel gas flow while the engine is stopped.

Incidentally, in the above-described embodiment, an ordinary box body (e.g. a box body manufactured for a product rather than a gasoline engine) may be used, instead of the lower half part of the fuel tank 5 of the gasoline engine.

INDUSTRIAL APPLICABILITY

According to the present invention, the zero-governor fitting configuration can be realized; thereby, the lower half of the fuel tank for a gasoline engine can be used, and the zero-governor and the fuel gas supply inlet-pipe can be surely arranged so that the engine vibrations and the heat radiation can be prevented from transmitting to the zero-governor.

The invention claimed is:

1. A zero-governor fitting structure for fitting the zero-governor to a gas engine, comprising
   at least one main chamber formed in a cylinder head so that air-fuel mixture of main fuel gas and air that are pre-mixed in an air-fuel mixer is burnt in the main chamber, and
   a zero-governor which establishes or regulates suitably a pressure of a fuel gas supplied to the air-fuel mixer,
   wherein a fuel tank which serves as a support box for supporting the zero-governor is provided to be fastened to an upper part of the gas engine, the support box being formed into a box body having two spaces of different depths, so that the zero-governor is fitted to a bottom plate of the shallower depth space of the support box via a vibration insulation gasket, and a gas supply inlet pipe and an elbow joint connected to the gas supply inlet pipe are housed in the deeper depth space of the support box, the direction of the gas flow from the gas supply inlet pipe is bent orthogonally toward the zero-governor at the elbow joint which is connected to a fuel gas inlet at the bottom of the zero-governor.

2. The zero-governor fitting structure according to claim 1, wherein
   the zero-governor is tightened and fastened to an upper surface of the bottom plate of the shallower depth space of the support box via the vibration insulation gasket by a plurality of bolts that are inserted into the shallower depth space from below of the bottom plate, and the zero-governor is also supported from the bottom side by the gas supply inlet pipe and the elbow joint that are housed in the deeper depth space of the support box.

3. The zero-governor fitting structure according to claim 1, wherein
   the support box for supporting the zero-governor is composed by use of a base structure of a box-shaped fuel tank having two spaces of different depths T1 and T2 where the depth T2 is deeper than the depth T1.

* * * * *